United States Patent
Salice (10) Patent No.: US 7,234,569 B2
(45) Date of Patent: Jun. 26, 2007

(54) SPIRAL-ACTION DAMPER

(75) Inventor: Luciano Salice, Carimate (IT)

(73) Assignee: Arturo Salice S.p.A., Novedrate (Como) (IT)

( * ) Notice: Subject to any disclaimer, the term of this patent is extended or adjusted under 35 U.S.C. 154(b) by 0 days.

(21) Appl. No.: 10/823,332

(22) Filed: Apr. 13, 2004

(65) Prior Publication Data

US 2004/0201154 A1    Oct. 14, 2004

(30) Foreign Application Priority Data

Apr. 14, 2003  (DE) ............................ 203 05 992 U
Jun. 26, 2003  (DE) ............................ 203 09 874 U (51) Int. Cl.
  *B60T 7/12*      (2006.01)
  *B60G 15/02*    (2006.01)
  *E05F 5/08*      (2006.01)

(52) U.S. Cl. ...................... 188/130; 267/202; 267/209; 16/85

(58) Field of Classification Search ................ 188/285, 188/129, 130; 267/200, 201, 202, 203, 195, 267/196, 205, 206, 214, 215, 136, 68, 209, 267/212; 16/82, 85, 86, 86 R, 86 A See application file for complete search history.

(56) References Cited

U.S. PATENT DOCUMENTS

| 1,025,388 | A | * | 5/1912 | Finnell et al. ............. 267/200 |
| 1,028,850 | A |   | 6/1912 | Aspegren ...................... 16/82 |
| 1,218,197 | A |   | 3/1917 | MacKinlay ................... 16/85 |
| 1,654,763 | A | * | 1/1928 | Tauscher ................... 188/129 |
| 4,829,628 | A |   | 5/1989 | Vuksic |
| 6,553,617 | B1 | * | 4/2003 | Salice .......................... 16/85 |

FOREIGN PATENT DOCUMENTS

| AT | 207289 | | 1/1960 |
| AT | 005125 | | 2/2002 |
| DE | 33028 | | 9/1885 |
| DE | 56719 | | 5/1891 |
| DE | 3401427 | | 7/1985 |
| DE | 29913854 | | 10/1999 |
| DE | 29913854 | U1 * | 10/1999 |
| DE | 202 05 905 | | 7/2002 |
| DE | 203 03 534 | | 3/2004 |
| DE | 203 02 524 | | 6/2004 |
| WO | WO 02/057578 | | 7/2002 |

* cited by examiner

Primary Examiner—Thomas Williams
(74) Attorney, Agent, or Firm—Dilworth & Barrese LLP (57) ABSTRACT

The invention relates to a damping device for movable furniture parts, for example for doors or drawers, comprising a piston or plunger which is slidably guided in a hollow body, e.g. a cylinder, with said piston or plunger being impinged upon by spring force into its pushed-out position. According to the invention, the hollow body comprises at least one section of a spiral-shaped stay of the internal screw thread, and/or the piston or plunger comprises at least one section of a spiral-shaped stay of the external screw thread. The stays of the screw threads are glidingly supported one on top of the other, or cams or journals of the hollow body or of the piston or plunger are supported on a screw-thread section of the other component. The pitch of the stays of the screw threads is greater than the pitch at which self-locking occurs.

16 Claims, 6 Drawing Sheets

SPIRAL-ACTION DAMPER

BACKGROUND OF THE INVENTION

The invention relates to a damping device for movable furniture parts, for example for doors or drawers, comprising a piston or plunger which is slidably guided in a hollow body, e.g. a cylinder, with said piston or plunger being impinged upon by spring force into its pushed-out position.

Devices of this type are used for decelerating movable furniture parts, for example doors, flaps or drawers, during vigorous movement into their closed position so as to reduce noise when they come to rest against carcass parts of items of furniture or fixed parts, and so as to reduce impact loads. In known devices of this type, the damping devices which are used for damping or decelerating the furniture parts are impinged upon along only a relatively small path in the closing region of the movable furniture parts so that they are only able to provide a correspondingly modest damping or deceleration action.

In the older utilities models 20 302 524.4 and 20 303 534.8 without prior publication, devices for damping the movement of movable furniture parts are described, in which for achieving considerable braking and damping of the furniture parts, the relatively small closing movement of said furniture parts is transmitted to a rotation damper or piston of a damping cylinder by way of at least two-staged gear means with a speed increasing ratio. Because of the necessary two-stage gear means, these damping devices are relatively expensive.

SUMMARY OF THE INVENTION

It is thus the object of the invention to create an economically producible damping device of the type mentioned in the introduction, which damping device provides good braking effect even at a short stroke of the plunger or piston.

According to the invention, in a damping device of the type mentioned in the introduction, this object is met in that the hollow body comprises at least one section of a spiral-shaped stay of the internal screw thread and/or the piston or plunger comprise/s at least one section of a spiral-shaped stay of the external screw thread; in that the stays of the screw threads are glidingly supported one on top of the other, or that cams or journals of the hollow body or of the piston or plunger are supported on a screw-thread section of the other component; and in that the pitch of the stays of the screw thread is greater than the pitch at which self-locking occurs. As a result of this, the damping device according to the invention, with a very short axial movement of the piston or plunger, ensures very good braking force, and that a rotary movement is superimposed on the axial movement, so that as a result of the parts which glide one on top of the other with friction, in a spiral movement, very good braking force in axial direction is achieved.

Expediently, a compression spring is restrained between the bottom of the cylinder and the plunger or piston. The force of the compression spring is such that when the plunger or piston is not under load said spring is able to slide said plunger or piston into its pushed-out position.

An intermediary piece can be arranged between the compression spring and the plunger or piston, with said intermediary piece being non-rotatably connected to said compression spring. This intermediary piece can comprise a roughened face, which, increasing the friction force, is supported by the plunger or piston. The other end of the compression spring can be non-rotatably held on a cover which forms the bottom of the cylinder.

A further embodiment of the invention provides for a section of the plunger to rotatably engage a borehole of a piston, which piston comprises at least one screw-thread section or journal.

If it is desired that the journal of the plunger, which journal emanates from the cylinder, only carries out a movement in axial direction, with no rotary movement being superimposed on this movement in axial direction, the cross-section of the plunger can be out of round, polygonal or comprise grooves or longitudinal wedges, and can pass through a rim or cover of the cylinder with a complementary cross section.

A particularly preferred embodiment provides for the piston to comprise a section of larger diameter which forms a circumferential step of sawtooth-like shape with beveled spiral-shaped flanks, and approximately axis-parallel flanks which are situated between the former, wherein journals of a cylinder which encompasses the piston are supported on the spiral-shaped flanks. A preferred improvement provides for the sawtooth-like step to be a flank of a groove made in the piston, with the upper flank of said groove in the region of the peaks of the steps forming pockets with gliding flanks whose base in each instance is approximately axis-parallel beside the peaks in the commencement region of the spiral-shaped flanks. This embodiment ensures that if the device is subjected to an impact force, the journals always meet the spiral-shaped gliding flanks in the commencement region, so that essentially their entire length can be utilised for damping the impact force.

Expediently, the cylinder is encompassed by an outer cylinder. The piston can be connected to the bottom plate of the outer cylinder. Expediently, the piston forms a hollow body, wherein a compression spring is restrained between the base of this hollow body and the base of the cylinder.

In order to increase frictional forces, a high-viscosity grease can be applied to components of the damping device which glide on each other, and/or to the flanks of the spiral-shaped stays of the screw-thread.

Advantageously, caps made of elastomeric material are placed onto the plungers, pistons or cylinders which accommodate the impact; in this way the damping frictional forces can be increased still further.

However, if a lack of the caps rotating relative to the components which push against said caps is undesirable, the caps can be rotatably connected to the plungers or cylinders.

A further preferred embodiment provides for the damping device to be inserted in the pot of a hinge or to be constructed in one piece with said pot of a hinge, such that during the closing movement, the plunger or cylinder comes to rest against a hinge arm or a swinging arm of the hinge.

According to another embodiment, the object of the invention is met in a damping device for movable furniture parts, for example for doors or drawers, comprising a piston or plunger which is slidably guided in a hollow body, e.g., a cylinder, with the piston or plunger being impinged upon by spring force into its pushed-out position, and the piston comprises an axial borehole and at least one section of a spiral shaped stay of the internal screw thread while the plunger comprises at least one section of a spiral-shaped stay of the external screw thread; the piston or the plunger is guided in the hollow body so as to be axially slidable and rotatable while the other part is axially slidable and non-rotatable; the rotatably guided piston or plunger comprises coupling devices which can be coupled, in the pushed-out position of the rotatable piston or plunger, with countercoupling devices of an element which is rotatable in the hollow body against resistance; and the pitch of the screw-thread stays exceeds the pitch at which self-locking occurs.

This embodiment of the damping device according to the invention, in addition to the relative rotation of the piston in relation to the plunger screwed into said piston, and in addition to axial displacement of both in the hollow body, makes possible a strong deceleration effect in a short distance in that the rotatable element exerts a strong decelerating countermoment on the piston or plunger coupled with said element. The damping device can be constructed such that the nonrotatable part, in other words either the piston or plunger which is guided so as to be axially slidable but nonrotatable, is guided out of the hollow body sufficiently far to absorb, by pushing into the hollow body, the impact of the part to be decelerated.

Expediently, the plunger, which can be screwed into the piston, comprises at least one radial cam or a spring which is guided in a longitudinal groove of the internal wall of the hollow body or in a bushing which closes off this hollow body.

The plunger or the piston can also be guided in the hollow body so as to be nonrotatable, in that it comprises an out of round outer contour, which is nonrotatably held by a complementary section of the hollow body.

A further embodiment of the invention provides for the element which can be rotated in relation to a decelerating moment of torsion to comprise a tubular section which is rotatably held in an annular groove in the bottom region of the hollow body. The rotatable section can additionally be embedded in the annular groove by means of a high-viscosity grease. This grease increases the friction or the rotation resistance of the tubular section. In order to increase the decelerating characteristics of the high-viscosity grease, adhesive components can be added to said grease.

Expediently, the coupling devices and countercoupling devices comprise sawtooth-like teeth arranged on the ring-shaped faces of the tubular section and of the tubular piston, which engage each other to form a coupling when the plunger is pushed in. When engaged in coupling action, for the purpose of taking along the tubular section, these sawtooth-shaped teeth comprise flanks which extend approximately in axial direction of the plunger. The other flanks of the sawtooth-shaped teeth are beveled such that as a result of spring force the parts which are in mutual engagement can be pushed apart again, without the decelerating rotatable element preventing separation and pushing out.

Expediently, a compression spring is restrained between the face of the journal, which is exposed by the annular groove, at the base of the hollow body and the rear end of the plunger.

BRIEF DESCRIPTION OF THE DRAWINGS

Embodiments of the invention are explained in more detail below by means of a drawing, as follows:

FIGS. 7+8: perspective views of a double swinging-arm hinge, with damping devices according to the invention being integrated in the hinge pot of said double swinging-arm hinge;

DESCRIPTION OF THE PREFERRED EMBODIMENTS

Figure 1:
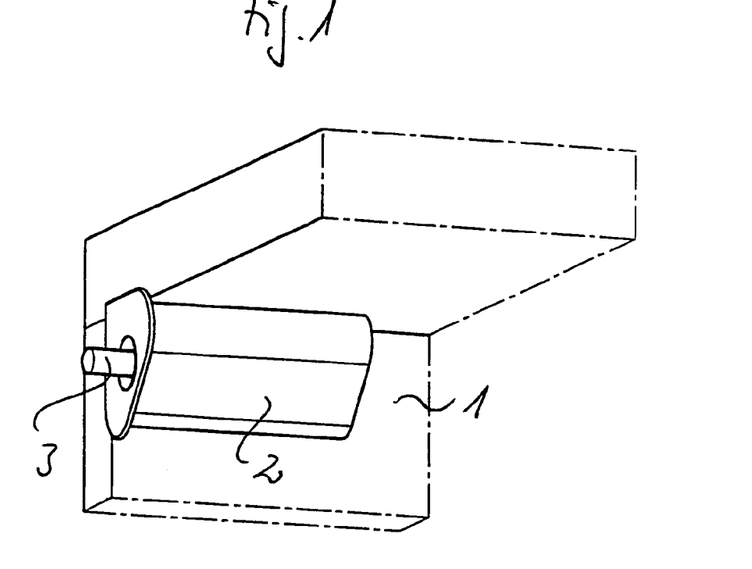
FIG. 1: a perspective view of the damping device according to the invention which is held in an adaptor housing at a corner of a cupboard.

FIG. 1 shows the upper left corner of a cupboard. At the inside of a sidewall 1 in an adaptor housing 2, which is attached to the side wall, a damping device is held whose plunger 3 protrudes beyond the face of the side wall 1 such that the impact of a door hitting this damping device is dampened.

Figure 2:
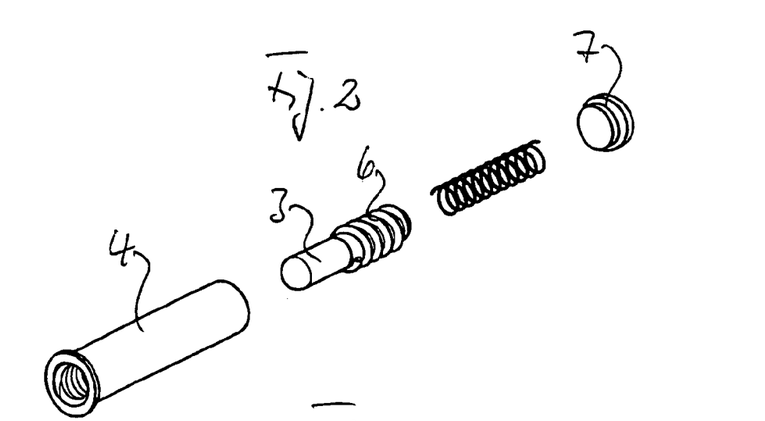
FIG. 2: a perspective exploded view of a first embodiment of the damping device according to the invention.
Figure 3:
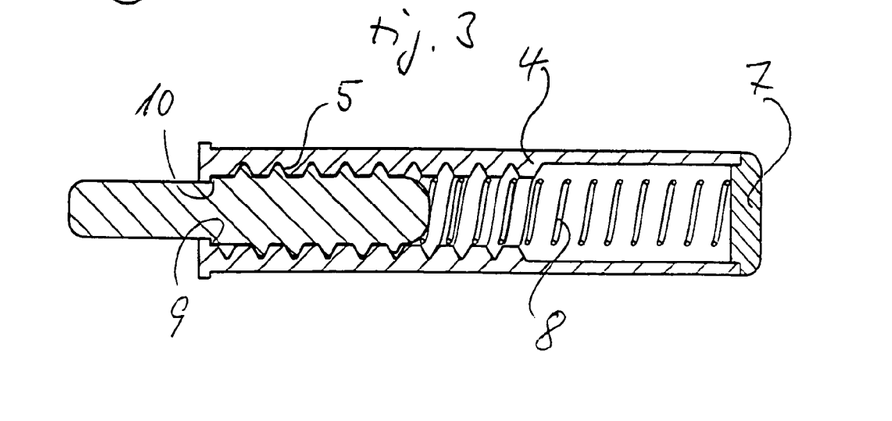
FIG. 3: a longitudinal section of the damping device according to FIG. 2 in its installed state.

FIGS. 2 and 3 show a first embodiment of the damping device according to the invention. Said damping device comprises a cylinder 4 which at its open end comprises an internal screw thread 5. The external screw thread 6 of the plunger 3 is screwed into this internal thread so that there is some play. The right part of the cylinder 4 comprises smooth walls without an internal screw thread, as shown. The cylinder 4 is closed off by a cover 7. A compression spring is restrained between the cover 7 and the plunger 3. Between its screw-thread section 6 and its round, smooth-walled section 3 which comes out of the cylinder, the plunger comprises a step 9 by which said plunger is supported on a step 10 which is formed by the inward-drawn rim of the cylinder 4.

Figure 4:
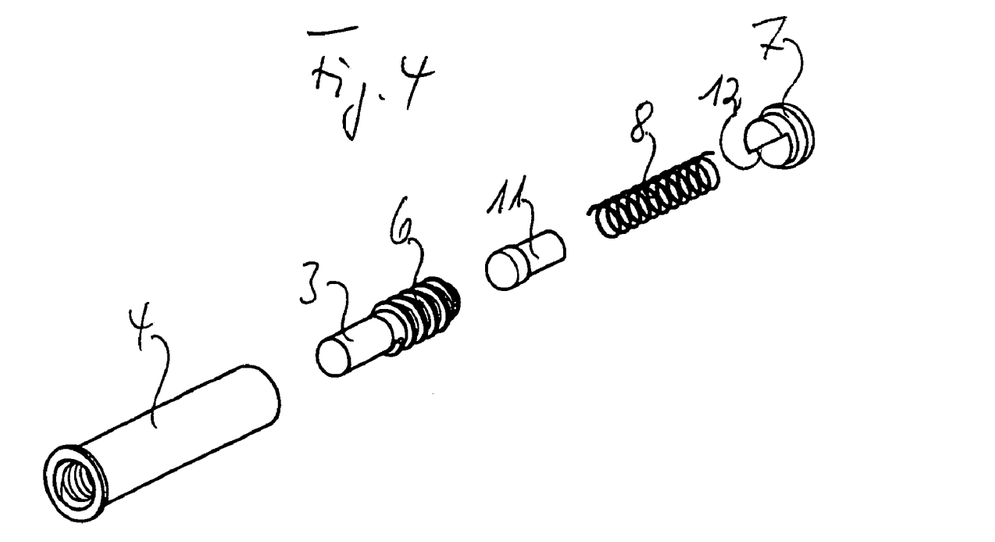
FIG. 4: a perspective exploded view of a second embodiment of the damping device according to the invention.
Figure 5:
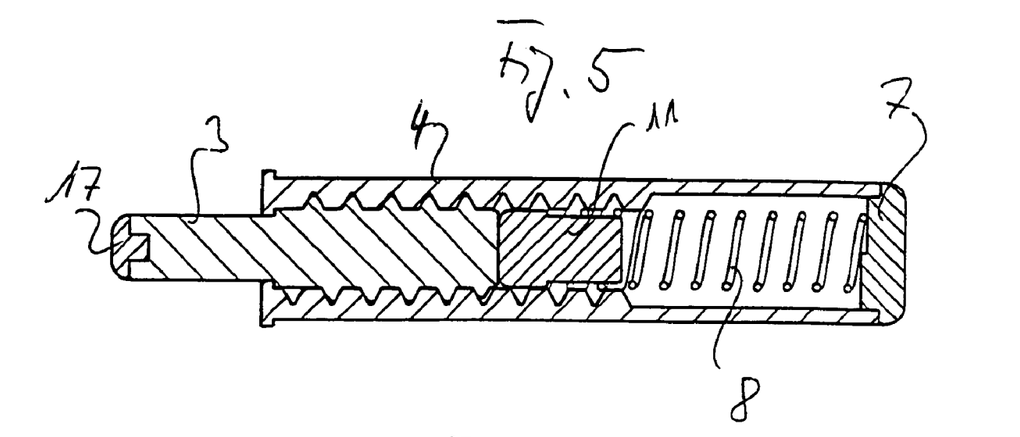
FIG. 5: a longitudinal section of the damping device according to FIG. 4 in its installed state.

The embodiment according to FIGS. 4 and 5 essentially differs from that according to FIGS. 2 and 3 only in that the end of the spring 8 facing the plunger is nonrotatably held at a section of reduced diameter of a stud 11, with the section of increased diameter resting against the plunger 3. The face of the thicker end part of the stud 11 can be roughened so that it rests with increased friction on the plane face of the plunger 3. The inside of the cover which closes off the cylinder 4 comprises a step 12 which supports the outer end of the spring 8 so as to be nonrotatable.

Figure 6:
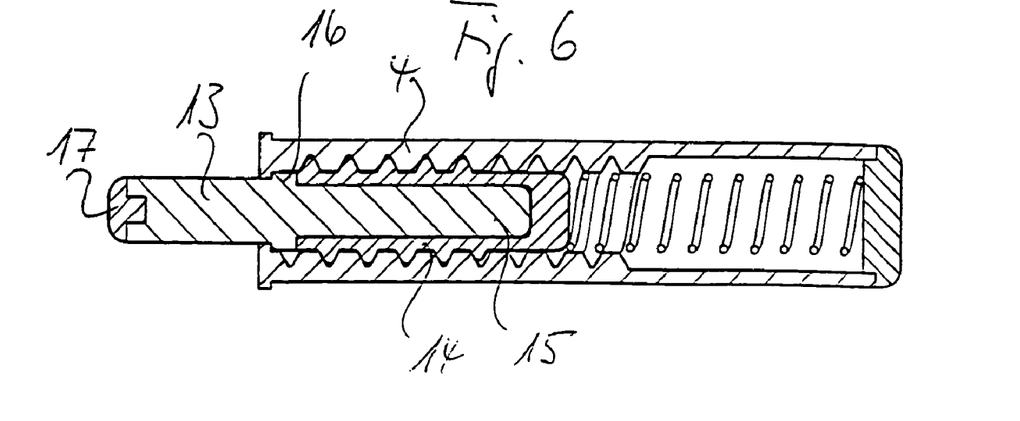
FIG. 6: a longitudinal section of a third embodiment of the damping device according to the invention.

In the embodiment according to FIG. 6, the plunger 13 and the piston-shaped part 14 which comprises an external screw thread are separate from each other. The piston-shaped part 14 comprises a stud which comprises an external screw thread which comprises a blind hole. A journal 15 of the plunger 13 engages this blind hole so that the piston-shaped stud 14 is rotatable relative to the plunger 13. The plunger 13 comprises a shoulder 16 on whose inner annular step the ring-shaped face of the piston-like stud 14 is supported. In the pushed-out state of the plunger, the outer annular step of the shoulder 16 rests against an annular step of the rim of the cylinder 4. The part of the plunger 13 which is adjacent to the annular step 16 is out of round, wherein the outlet opening from the cylinder 4, too, is of a complementary unround shape, so that the plunger is held to the cylinder 4 so as to be axially displaceable but nonrotatable. A cap 17 made of elastomeric material is in place on the outer impact surface of the plunger 13.

Figures 7, 8:
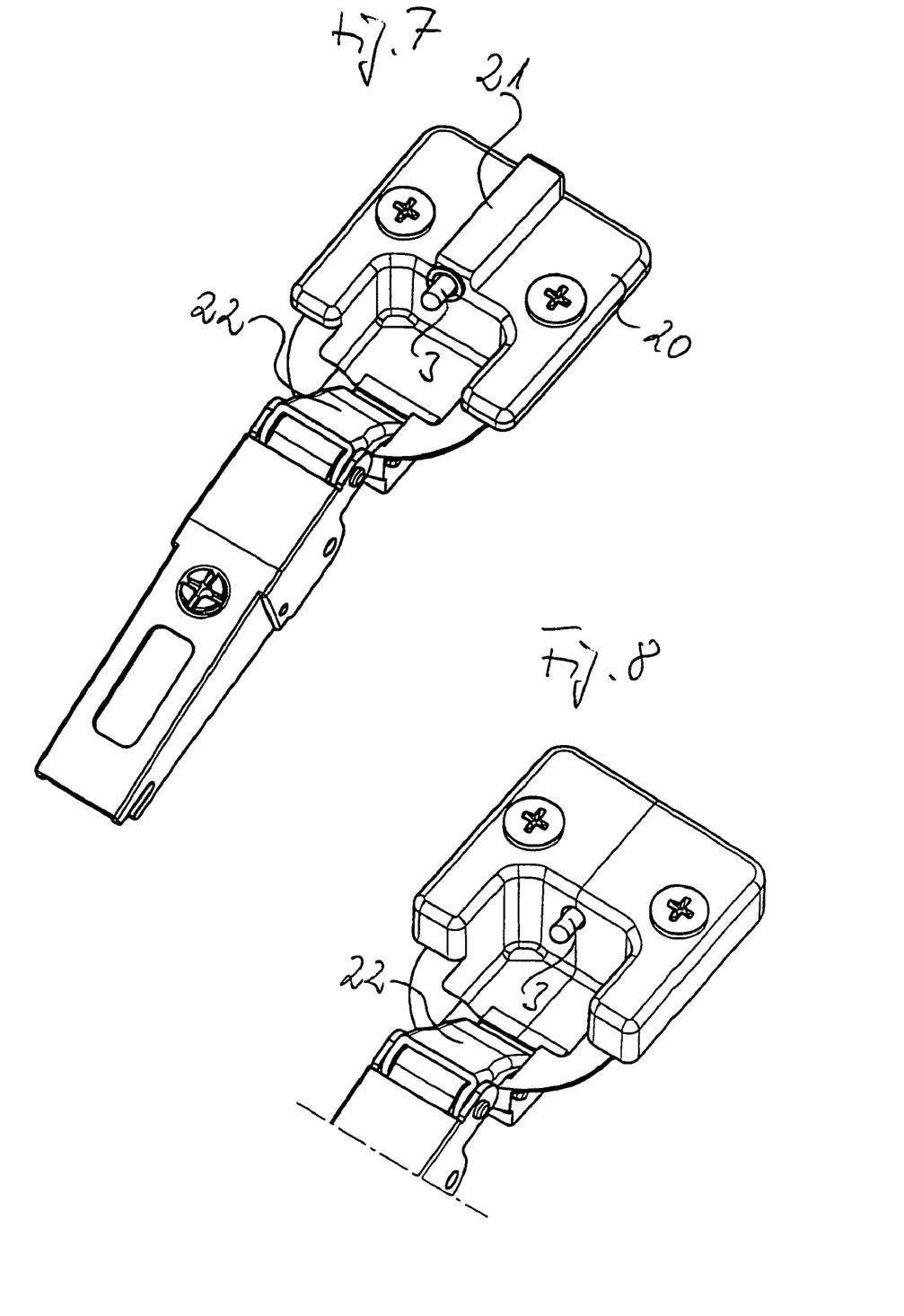
Figure 9:
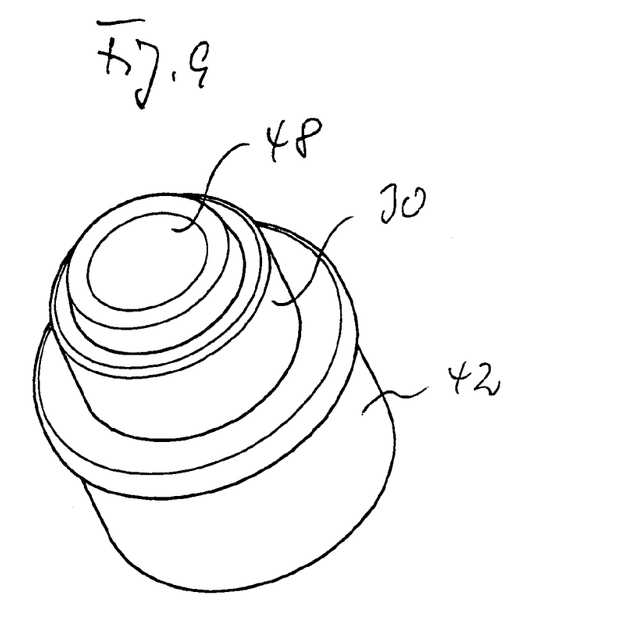
FIG. 9: a perspective view of a fourth embodiment of the damping device according to the invention.
Figure 10:
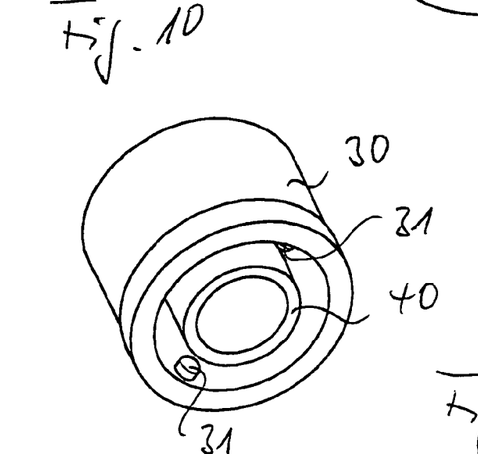
FIG. 10: a perspective view of the inner cylindrical part of the damping device according to FIG. 9.
Figure 11:
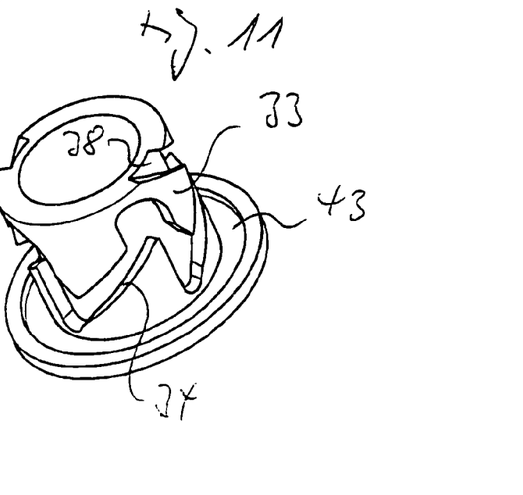
FIG. 11: a perspective view of the piston-shaped part of the damping device according to FIG. 9.
Figure 12:
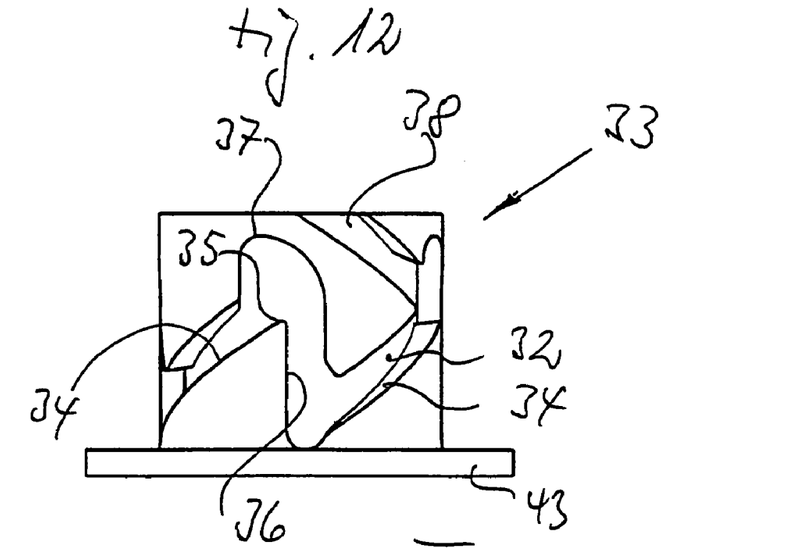
FIG. 12: a lateral view of the piston-shaped part according to FIG. 11.
Figure 13:
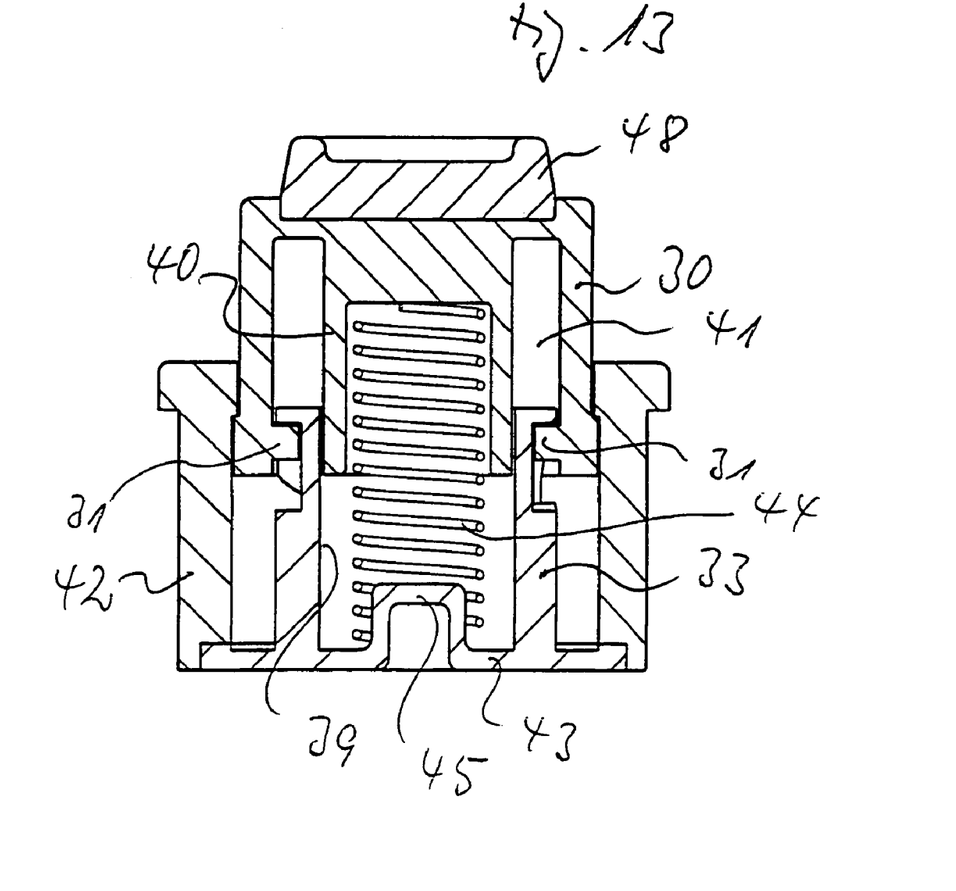
FIG. 13: a cross section of the damping device according to FIG. 9.

FIG. 7 shows a perspective view of a double swinging-arm hinge in which the attachment flange 20 of the hinge pot in its middle plane comprises a housing-like part 21 in which a damping device of the type according to the invention is held such that its plunger 3 protrudes into the pot-shaped recess. During closing of the hinge, the outer swinging arm 22 of the double swinging-arm hinge hits the plunger 3 so that it is damped with substantial deceleration force in a short distance.

The embodiment according to FIG. 8 differs from that according to FIG. 7 only in that the hinge pot is divided along its longitudinal centre plane and the halves formed in this way are put together in such a way that the cylinder of the damping device can be put together from facing recesses of both divided halves. The plunger 3 of the damping device again protrudes into the pot-shaped recess in such a way that the outer swinging arm 22 comes to rest against said plunger, thus experiencing very considerable deceleration forces during closing.

The embodiment of the damping device shown in FIGS. 9 to 13 comprises a cylindrical part 30 which at its inner open end region on opposing sides comprises two facing journal-shaped cams 31. These cams 31 engage sawtooth-shaped grooves 32 of a piston-shaped part 33. The lower flanks of these sawtooth-shaped grooves comprise spiral-shaped sections 34 which can extend over a circumferential angle of for example 90°. The spiral-shaped sections 34 end in peaks 35 which adjoin the flanks 36 which are approximately axis-parallel, with said axis-parallel flanks 36 forming the transition to the following spiral-shaped flank 34. In the region of the peaks, the upper flanks of the groove 32 are extended in the manner of pockets, wherein the base 37 of these pockets in axis-parallel projection is positioned on the spiral-shaped flanks 34 so as to adjoin the peaks. For the purpose of inserting the cams 31 into the sawtooth-shaped grooves 32, freely running out grooves 38 are provided which lead to the lateral flanks of the pocket-shaped recesses. As a result of this embodiment, the spiral movement of the piston is followed by its linear return, which is thus facilitated and accelerated.

In order to achieve good guidance, on the piston-shaped part 33, of the cylindrical part 30 which can be pushed in, the piston 33 comprises a cylindrical recess 39 in the shape of a blind-hole. An inner cylindrical part 40 of the cylinder 30, which is constructed so as to be concentric to the cylinder 30 such that the piston, which is also cylindrical, is guided in the annular space 41 between the cylinder 30 and the interior cylinder 40. For further stabilisation, the cylinder 30 is encompassed by an outer cylinder 42 which is held on a bottom plate 43 which is preferably constructed in one piece with the cylindrical piston 33. Between the shoulder of the cylindrical recesses of the piston 33 and the interior cylinder 40, a compression spring 44 is restrained which is held on a journal-shaped elevation 45 of the base plate 33 so as to be centred. The rim of the exterior cylinder 42 comprises an interior annular step while the rim of the cylinder 30 comprises an exterior annular step, with said steps being located side by side when the cylinder 30 is fully pushed out. A resilient pad 48, made of elastomeric material, is held in the common bottom of the cylinder 30 and the interior cylinder 40, in a corresponding recess.

In order to set the desired friction values, grease of suitable viscosity can be applied to the spiral-shaped stays or flanks. However, the grease is preferably applied to the interior wall of the recess 39 as well as to the exterior wall of the interior cylinder 40, so that said wall can provide the desired deceleration force in the gap created by the relative movement of these components.

Figure 14:
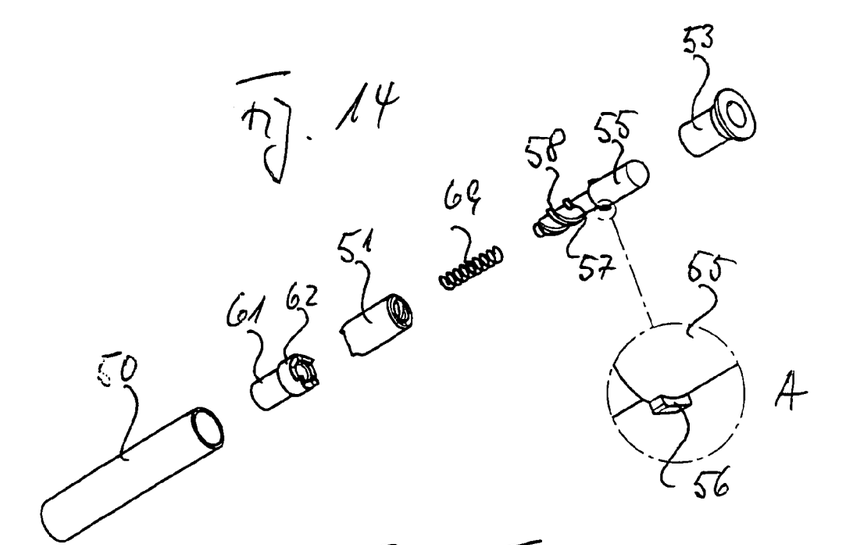
FIG. 14: an exploded view of a further embodiment of the damping device according to the invention, with A showing an enlarged view of a detail.
Figure 15:
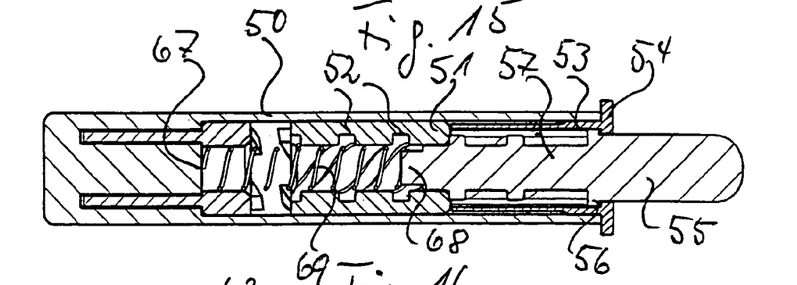
FIG. 15: a longitudinal section of the installed damping device according to FIG. 14 with its plunger in the pushed-out state.
Figure 16:
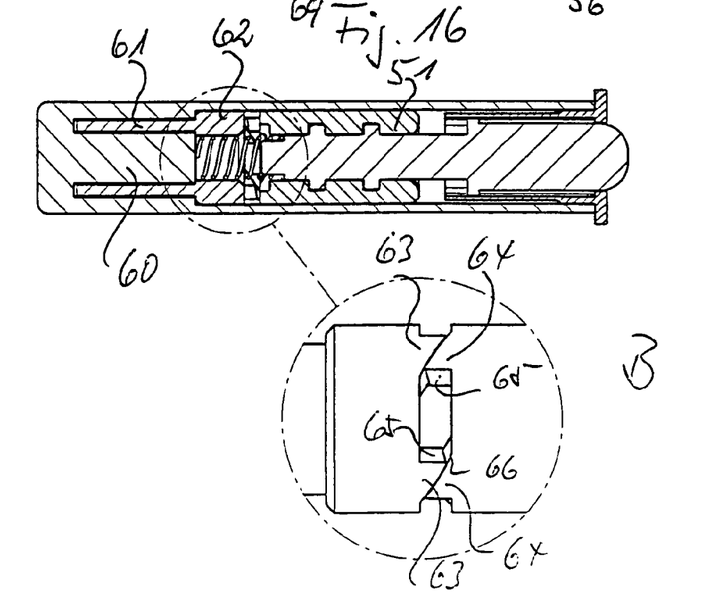
FIG. 16: a view corresponding to that shown in FIG. 15, with the plunger in the pushed-in state, with B showing an enlarged view.

The embodiment shown in FIGS. 14 to 16 of the damping device according to the invention comprises a hollow body in the shape of a cylinder 50. In the cylinder 50, a piston 51, which comprises a through hole, is guided so as to be axially displaceable and freely rotatable. At its interior wall, the tubular piston 51 comprises an internal screw thread 52. On its right open side, the cylinder 50 is closed off by a bush 53 which is supported on the rim of the cylinder by a flange 54 and which is nonrotatably and in axial direction nonslidably connected to said cylinder by known means. In the bush 53, a plunger 55 is guided so as to be axially slidable but nonrotatable. The plunger protrudes beyond the flange 54 essentially by the length by which it can be pushed into the cylinder by pushing action. Following on from its section which protrudes beyond the cylinder, the plunger comprises cams 56 on opposite sides. In the pushed-out state of the plunger 55 as shown in FIG. 15, said cams 56 are supported by an annular step of the bush 53, with said cams being formed by inward-drawn rim sections of the bush 53. At its tubular section reaching into the cylinder 50, the bush 53 comprises opposing grooves arranged in axial direction, in which grooves the cams 56 are guided which form a non-rotation lock. In the circled detail A in FIG. 14, the cams 56 are shown in an enlarged view. Following on from the cams 56, there is a section 57 of the plunger 55 which comprises a spiral-shaped screw-thread stay 58 with a pitch which is greater than the pitch at which self-locking occurs. When the plunger 55 is pushed into the cylinder 50, the section 57 of the plunger 55 which comprises the screw thread 58 can be screwed into the internal screw thread 52 of the tubular piston 51.

An annular groove in the bottom region of the cylinder 50 exposes a journal 60. A tubular section 61 is inserted in the annular groove so that there is some play. Following on from the face of the journal 60, the tubular piece 61 comprises a wider section 62, which section forms interior and exterior annular steps by means of which this widened section 62 is supported on annular steps which are formed on both sides of the groove between the groove and the interior cylinder wall on the one hand and between the interior cylinder wall and the face of the journal 60 on the other hand.

The annular faces, which point towards each other, of the widened section 62 of the tubular piece 61 and of the tubular piston 51 comprise sawtooth-shaped teeth 63, 64, which in the circular detail B of FIG. 16 are shown in an enlarged view. The teeth 63, 64 comprise flanks 65 aligned in axial direction and inclined flanks 66. A compression spring 69 is restrained between the face 67 of the journal 60 and the end of the plunger 55 with the smaller diameter. This compression spring 29 attempts to push the plunger 55 from its pushed-in position shown in FIG. 16 to its pushed-out position shown in FIG. 15.

By means of a high-viscosity grease, which can comprise adhesive components in order to increase the viscosity of said grease, the tubular piece 61 is held in the annular groove in the bottom region of the cylinder 50 so that it provides increased resistance to being rotated.

If the section of the plunger 55, which section protrudes beyond the cylinder 50, is subjected to an impact or to pressure, said plunger 55 in a short distance pushes the annular piston 51, into which the plunger is already screwed, against the face of the widened tubular section 62 so that the teeth 63, 64 engage each other in the manner of a claw coupling. As soon as the tubular piston 51 pushes against the tubular part 61, 62, further pushing in of the plunger 55 by the stays of the internal and external screw threads sliding off each other, said tubular piston 51 is made to turn anticlockwise so that the tubular piston 51 achieves a coupled connection with the tubular section 61, 62. Since the tubular section 61, 62 can only be rotated against increased friction resistance, during further pushing in of the plunger 55 into the cylinder 50 said tubular section 61, 62 has a strong damping effect on said cylinder 50. When there is no longer any pushing action and thus pressure acting on the plunger 55, the compression spring 59, by way of a screwing return movement of the tubular piston 51, slides the plunger back into its home position as shown in FIG. 15.

The invention claimed is:

1. A damping device for movable furniture parts, comprising a plunger (3) which is slidably guided in a hollow body (4), with said plunger (3) being impinged upon by a compression spring (8) into its pushed-out position, wherein
the hollow body (4) comprises at least one section of a spiral-shaped stay (5) of an internal screw thread and the plunger (3) comprises at least one section of a spiral-shaped stay (6) of an external screw thread;
the stays (5,6) of the screw threads are glidingly supported one on top of the other;
pitch of the stays (5,6) of the screw threads is greater than pitch at which self-locking occurs; and
an intermediary piece (11) separated from the plunger (3) and having a face resting against a separate face of said plunger (3), is arranged to be slidably or rotatably guided in the hollow body (4) directly adjacent to an inner surface of said hollow body (4) between the compression spring (8) and plunger (3).

2. The damping device according to claim 1, wherein a high-viscosity grease is applied to surfaces of the components of the spiral-shaped screw-thread stays of the damping device which surfaces glide on each other, and/or to the flanks of said spiral-shaped screw-thread stays.

3. The damping device according to claim 1, wherein said intermediary piece (11) is nonrotatably connected to said compression spring (8).

4. The damping device according to claim 3, wherein the intermediary piece (11) comprises a roughened face which is supported by the plunger (3).

5. The damping device according to claim 1, wherein the compression spring (8) is non-rotatably held on a cover (7) which forms the bottom of a cylinder forming said hollow body (4).

6. The damping device according to claim 1, wherein said damping device is inserted in a pot (20) of a hinge or is constructed in one piece with said pot (20) of the hinge, such that during the closing movement, the plunger (3) or cylinder comes to rest against a hinge armor a swinging arm (22) of the hinge.

7. The damping device according to claim 6, inserted in a middle plane of the hinge pot (20).

8. A damping device for movable furniture parts, comprising a plunger (3) which is slidably guided in a hollow body (4), with said plunger (3) being impinged upon by a compression spring (8) into its pushed-out position, wherein
the hollow body (4) comprises at least one section of a spiral-shaped stay (5) of an internal screw thread and the plunger (3) comprises at least one section of a spiral-shaped stay (6) of an external screw thread;
the stays (5,6) of the screw threads are glidingly supported one on top of the other;
pitch of the stays (5,6) of the screw threads is greater than pitch at which self-locking occurs;
an intermediary piece (11) is in contact with the plunger (3) and arranged to be slidably or rotatably guided in the hollow body (4) between the compression spring (8) and plunger (3); and
caps made of elastomeric material are placed onto the impact-absorbing plungers or cylinders.

9. The damping device according to claim 8, wherein the caps are rotatably connected to the plungers or cylinders.

10. A damping device for movable furniture parts, comprising a plunger (3) which is slidably guided in a hollow body (4), with said plunger (3) being impinged upon by spring force (8) into its pushed-out position, wherein
the hollow body (4) comprises at least one section of a spiral-shaped stay (5) of an internal screw thread and the plunger (3) comprises at least one section of a spiral-shaped stay (6) of an external screw thread;
the stays (5, 6) of the screw threads are glidingly supported one on top of the other;
the pitch of the stays of the screw thread is greater than the pitch at which self-locking occurs; and
an intermediary piece (11) separated from the plunger (3) and having a face resting against a separate face of said plunger (3), is arranged between the plunger (3) and a compression spring (8) to be in contact with the compression spring (8) and directly adjacent to an inner surface of said hollow body (4).

11. A damping device for movable furniture parts, comprising
a plunger (3) which is slidably guided in a hollow body (4), with said plunger (3) being impinged upon by spring force (8) into its pushed-out position, wherein
the hollow body (4) comprises at least one section of a spiral-shaped stay (5) of an internal screw thread and the plunger (3) comprises at least one section of a spiral-shaped stay (6) of an external screw thread;
the stays (5,6) of the screw threads are glidingly supported one on top of the other;
the pitch of the stays of the screw thread is greater than the pitch at which self-locking occurs;
an intermediary piece (11) is arranged between and in contact with a compression spring (8) and the plunger (3); and
said intermediary piece (11) is constituted by a stud (11) separate from said plunger (3), said stud (11) having a reduced diameter portion non-rotatably retained by an end of said compression spring (8) and en increased diameter portion resting against said plunger (3).

12. The damping device according to claim 11, wherein a face of said stud (11) contacting said plunger (3) is roughened to increase frictional contact with a corresponding planar face of said plunger (3).

13. The damping device according to claim 11, additionally comprising a cover (7) forming a bottom of the cylinder and comprising a step (12) arranged to non-rotatably support an end of said spring (8) opposite said stud (11).

14. A damping device for movable furniture pads, comprising
- a plunger (3) which is slidably guided in a hollow body (4), with said plunger (3) being impinged upon by a compression spring (8) into its pushed-out position, wherein
- the hollow body (4) comprises at least one section of a spiral-shaped stay (5) of an internal screw thread and the plunger (3) comprises at least one section of a spiral-shaped stay (6) of an external screw thread;
- the stays (5,6) of the screw threads are glidingly supported one on top of the other;
- pitch of the stays (5,6) of the screw threads is greater than pitch at which self-locking occurs;
- an intermediary piece (11) is in contact with the plunger (3) and arranged to be slidably or rotatably guided in the hollow body (4) between the compression spring (8) and plunger (3); and
- said intermediary piece (11) is constituted by a stud (11) separate from said plunger (3), said stud (11) having a reduced diameter portion non-rotatably retained by an end of said compression spring (8) and an increased diameter portion resting against said plunger (3).

15. The damping device according to claim 14, wherein a face of said stud (11) contacting said plunger (3) is roughened to increase frictional contact with a corresponding planar face of said plunger (3).

16. The damping device according to claim 14, additionally comprising a cover (7) forming a bottom of the cylinder and comprising a step (12) arranged to non-rotatably support an end of said spring (8) opposite said stud (11).

\* \* \* \* \*